United States Patent [19]

Olszewski et al.

[11] Patent Number: 5,323,843
[45] Date of Patent: Jun. 28, 1994

[54] LIH THERMAL ENERGY STORAGE DEVICE

[75] Inventors: Mitchell Olszewski; David G. Morris, both of Knoxville, Tenn.

[73] Assignee: Martin Marietta Energy Systems, Inc., Oak Ridge, Tenn.

[21] Appl. No.: 924,928

[22] Filed: Aug. 5, 1992

[51] Int. Cl.$^5$ ............................................. F28D 20/00
[52] U.S. Cl. .................................. 165/10; 165/104.11; 165/917
[58] Field of Search ........................ 165/10, 104.11, 917

[56] References Cited

U.S. PATENT DOCUMENTS

| | | | |
|---|---|---|---|
| 3,029,596 | 4/1962 | Hanold et al. | 165/104.11 |
| 4,696,338 | 9/1987 | Jensen et al. | |
| 4,727,930 | 3/1988 | Bruckner et al. | |
| 4,760,713 | 8/1988 | Trocciola et al. | |
| 4,782,669 | 11/1988 | Trocciola et al. | |
| 4,809,771 | 3/1989 | Kennel et al. | 165/10 |
| 4,911,232 | 3/1990 | Colvin et al. | |

OTHER PUBLICATIONS

M. Olszewski et al., Assessment of Energy Storage Concepts for Use in Pulsed Space Power Systems, Oak Ridge National Laboratory, Oak Ridge, TN 37830, Aug. 1987.
J. W. Whittaker, Characterization of Acoustic Emission from Thermally-Cycled Lithium Hydride, Oct. 5, 1987, Oak Ridge Y-12 Plant, Oak Ridge, TN 37831.
D. G. Morris et al., Development of Encapsulated Lithium Hydride Thermal Energy Storage for Space Power Systems, Dec. 1987, Oak Ridge National Lab., Oak Ridge, TN.
M. Olszewski et al., Development of Encapsulated Lithium Hydride Thermal Energy Storage, Aug. 1989, Oak Ridge National Lab., Oak Ridge, TN.
M. Olszewski et al., Value of Energy Storage in Pulsed Space Power Systems, Jan. 1988, Oak Ridge National Lab., Oak Ridge, TN.
D. G. Morris et al., Development of Encapsulated Lithium Hydride Sink-Side Thermal Energy Storage for Pulsed Space Power, Jun. 1988, Oak Ridge National Lab., Oak Ridge, TN.
M. Siman-Tov et al., Performance Tests of Encapuslated Lithium Hydride for Thermal Energy Storage in Space Power Systems, Jan. 19989, Oak Ridge, TN.
J. P. Foote et al., Encapsulated Sink-Side Thermal Energy Storage for Pulsed Space Power Systems, Aug. 1987, Oak Ridge National Lab., Oak Ridge, TN.

*Primary Examiner*—Albert W. Davis, Jr.
*Attorney, Agent, or Firm*—Edward A. Pennington; Joseph A. Marasco; Harold W. Adams

[57] ABSTRACT

A thermal energy storage device for use in a pulsed power supply to store waste heat produced in a high-power burst operation utilizes lithium hydride as the phase change thermal energy storage material. The device includes an outer container encapsulating the lithium hydride and an inner container supporting a hydrogen sorbing sponge material such as activated carbon. The inner container is in communication with the interior of the outer container to receive hydrogen dissociated from the lithium hydride at elevated temperatures.

24 Claims, 2 Drawing Sheets

LiH THERMAL ENERGY STORAGE DEVICE

This invention was made with Government support under contract DE-AC05-84OR21400 awarded by the U.S. Department of Energy to Martin Marietta Energy Systems, Inc. and the Government has certain rights in this invention.

FIELD OF THE INVENTION

The present invention relates generally to heat exchange devices and, more particularly, to a lithium hydride (LiH) thermal energy storage device having enhanced specific energy. The device uses a hydrogen sorbing material as a reversible sponge so that lithium and hydrogen are physically separated during the dissociation phase of operation.

BACKGROUND OF THE INVENTION

Space power applications have a variety of energy requirements, including steady power outputs and pulsed high energy outputs. Pulsed mode power operations require high energy power bursts for relatively short durations. The thermal management systems are required to dissipate the excess thermal energy produced during the pulsed operations. To accommodate the large amounts of excess thermal energy, large heat transfer and heat dissipating devices are ordinarily required.

Thermal energy storage devices have been proposed to reduce the size and mass of the thermal management system. In this manner, a portion of the reject heat from the primary power source or other system power components are placed in a thermal energy storage system during peak power production and power use. The stored heat may then be dissipated into space during a non-operational portion of the orbit which can be an order of magnitude longer than the pulse cycle. The thermal energy storage enables the heat rejection system to be sized for an orbital average duty rather than peak demand. The thermal management system can therefore be reduced in size and mass. In particular, a smaller radiator can be used since the heat rejection rate is reduced. The overall mass of the system can be reduced where the mass of the radiator is reduced more than the mass of the heat storage device.

Lithium hydride (LiH) has been proposed for use in thermal energy storage devices. Various aspects of LiH thermal energy storage devices are described in a publication entitled "Development of Encapsulated Lithium Hydride Thermal Energy Storage For Space Power Systems" by D. G. Morris, J. P. Foote and M. Olszewski, published December 1987 for the U.S. Department of Energy (U.S. Government Printing Office 1988-548-118/60135), and "Development of Encapsulated Lithium Hydride Thermal Energy Storage" by M. Olszewski, and M. Siman-Tou, published by IEEE (Proceedings of the 24th Intersociety Energy Conversion Engineering Conference - Vol. 6 - "Post Deadline papers and Index"). Both of these publications are incorporated herein by reference.

It was noted in the aforementioned publications that hydrogen gas ($H_2$) formed by dissociation can be lost by passing through the encapsulating shell and, depending on the volume of $H_2$ loss, overall efficiency will diminish.

In view of the above, a need exists for an improved thermal energy storage device in which free $H_2$ created during dissociation is prevented from being lost.

SUMMARY OF THE INVENTION

The limitations of the previous thermal energy storage systems are obviated by the present invention while minimizing the mass of the storage system. More specifically, the invention is directed to a thermal energy storage system having a reversible hydrogen sorbing material to either absorb or desorb hydrogen gas dissociated from the lithium hydride energy storage material.

An object of the present invention is to provide a thermal energy storage device that is able to utilize the heat of dissociation of the hydrogen gas from lithium hydride as well as the latent heat and sensible heat.

The energy storage device of the invention includes a hydrogen sorbing material that is reversible to enable the sorption of hydrogen and release of hydrogen gas to reform lithium hydride thereby increasing the efficiency of the system. Sorbing the hydrogen allows the system to utilize the heat of dissociation and to rejuvenate the lithium hydride without loss of density or storage capacity.

The hydrogen sorbing material preferably has a high hydrogen sorption capacity, low molar mass, low heat of reaction and high specific heat. In preferred embodiments the hydrogen sorbent is activated charcoal or sodium- or potassium-based zeolites.

The advantages of the invention are basically attained by providing a thermal energy storage device which includes first container means for containing a quantity of $H_2$ sorbing material, and second container means, enveloping the first container means, for containing a quantity of LiH phase change material, said phase change material being in a solid phase until heated by a heat source to a liquid phase, whereby $H_2$ and Li are produced by dissociation, said $H_2$ passing through the first container means and being stored in the $H_2$ sorbing material until the LiH phase change material is regenerated by cooling, whereby the $H_2$ passes back through the inner shell and reforms with the Li.

In another aspect of the present invention, the two container means are separated from each other and the interior chambers thereof are in fluid communication with each other through conduit means. A regulator valve may be employed in the conduit means to isolate the two container means.

Other objects, advantages and salient features of the invention will become apparent from the following detailed description, which taken in conjunction with the annexed drawings, discloses preferred embodiments of the invention.

DETAILED DESCRIPTION OF THE INVENTION

Figure 1:
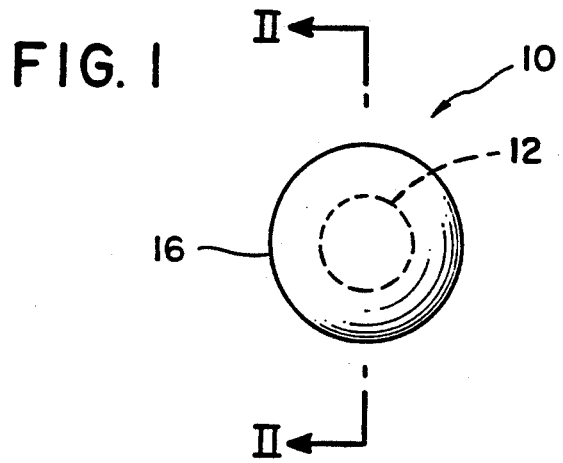
FIG. 1 is side-elevational view of a first preferred embodiment of a thermal energy storage device according to the present invention.
Figure 2:
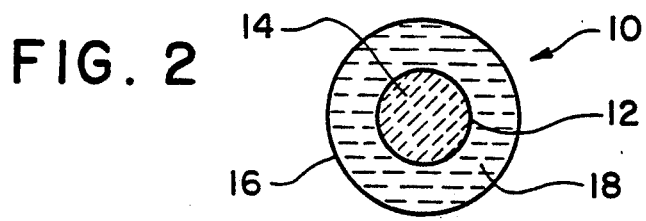
FIG. 2 is a sectional view taken along line II—II of FIG. 1.
Figure 3:
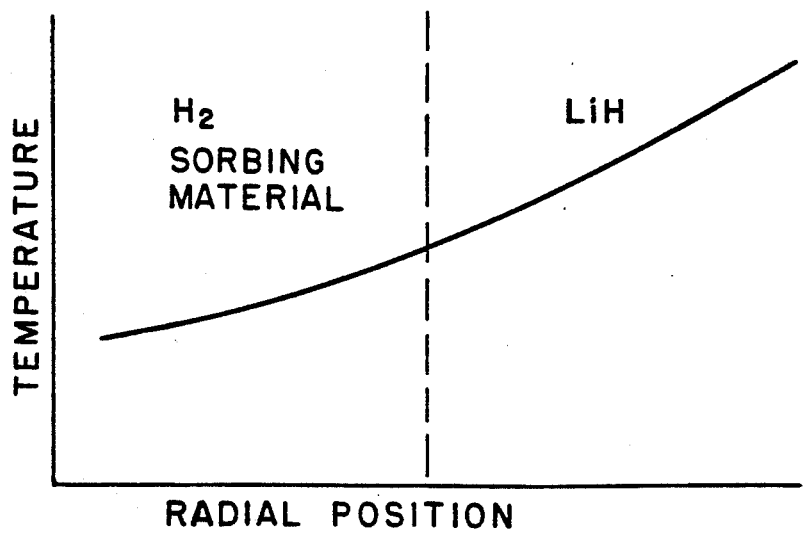
FIG. 3 is a graph showing a thermal gradient for the thermal energy storage device of FIGS. 1 and 2.

Referring now to FIGS. 1–3, a thermal energy storage device 10 includes an inner spherically shaped shell 12 which contains a quantity of $H_2$ sorbing material 14. The inner shell 12 is enclosed in an outer spherically shaped shell 16 which contains a quantity of LiH phase change material 18, such as $Li^6H$. Preferably, the phase change material 18 completely surrounds the inner shell 12. 30 The inner shell 12 is $H_2$ permeable and may be made of Fe and may have a thickness of about 0.1 m.m. The inner shell 12 also creates an $H_2$ permeable barrier between the $H_2$ sorbing material 14 and the LiH phase change material 18.

The $H_2$ sorbing material may be any material having a vapor pressure matched to the LiH phase change material, a high sorption capacity, a low molar mass, a low heat of reaction, and a high specific heat. Preferred materials include Na-based zeolites, K-based zeolites and activated charcoal. All have low heats of reaction and are about 15 wt. % $H_2$ when saturated.

The outer shell 18 may be made of any suitable material such as molybdenum or stainless steel (particularly 304L stainless steel), and may also have a thickness of about 0.1 m.m. The diameter of the outer shell 18 may be in the range of 4–6 c.m. with the diameter of the inner shell 12 being roughly ½ that of the outer shell. Generally, the shell thickness can be selected to be about 1% of the inside radius.

Although other shapes may be employed, spherical shells, both inner and outer, are preferred due to their strength and their surface area. The shells, both inner and outer, can be fabricated in equal halves which are welded together after placing the respective material in each. Centering pins (not shown) or other suitable structures may be employed to position the inner shell 12 centrally in the outer shell. Since one of the intended uses of the devices is in a microgravity environment of space, the smaller inner shell 12 should be positioned where a void is likely to form, which is normally in the center. For a discussion of void formation, see the aforementioned publication by Morris, Foote and Olszewski.

The thermal energy storage device 10 is used in a heat transfer structure where mass efficiency is a necessity. Such is the case for many space applications where high power is required in pulsed mode, i.e., for moderately short periods of time.

The LiH material 18 is at first in a solid phase. When the shell 16 is exposed to heat, by way of being disposed in the flow of a cooling fluid, for example, the LiH material 18 is caused to melt and, in the process, $H_2$ and Li are formed by dissociation. A thermal gradient is created during heating of the device 10, as illustrated in FIG. 3. This creates a thermal driving force whereby differential pressures in the two shells cause $H_2$ to flow back and forth through the inner shell 12 as the device 10 cycles between discharge and recharge. The $H_2$ formed by dissociation is driven into the $H_2$ sorbing material 14 through the inner shell 12 where it is stored until the LiH material 18 is cooled by subsequent radiator cooling.

In use, several of the thermal energy storage devices may be used to fill a "thermal fill" structure, through which a cooling fluid passes. Regeneration of the thermal energy storage devices, wherein the LiH material is transformed back to solid phase, occurs by circulating the cooling fluid through a radiator. Thus, in space applications, the waste heat is dissipated in space through the radiator.

Other variations of the preferred embodiment could involve different $H_2$ sorbing materials, such as metal hydride/metal and eutectic or peritectic coordinative mixtures. These could simplify the concept by allowing a mixing of LiH material and the $H_2$ sorbing material, thus eliminating the hydrogen barrier. Also, rather than having an enclosure within an enclosure, other configurations could be used where the sorbing material is juxtaposed with the thermal energy storage material. One example would be where annuli containing the thermal energy storage material are fitted over tubes containing the $H_2$ sorbing material.

Figure 4:
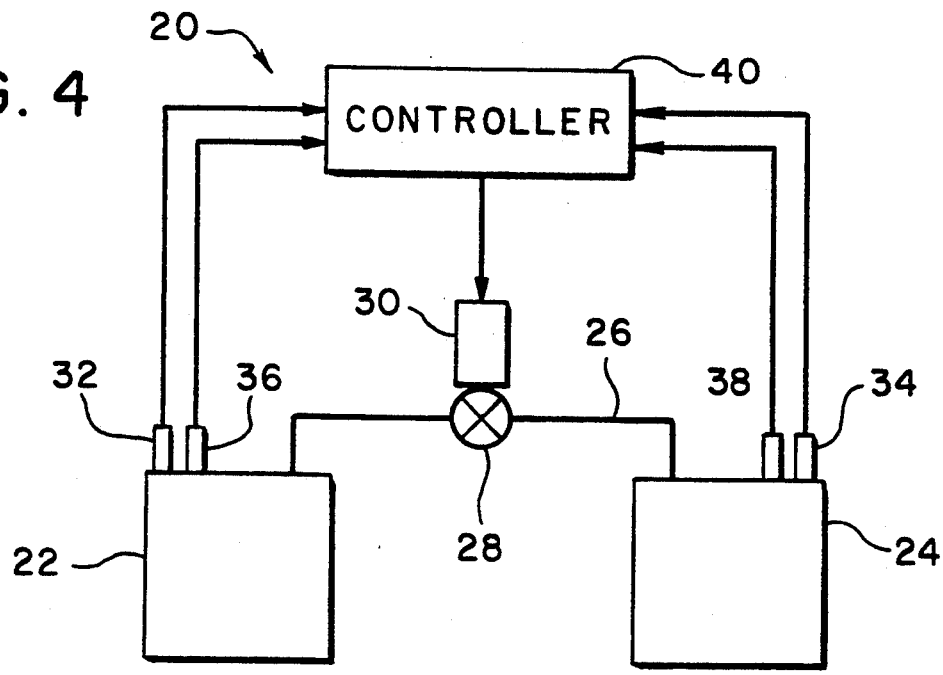
FIG. 4 is a schematic view of a second preferred embodiment of a thermal energy storage device according to the present invention.

Another particular embodiment of the invention is illustrated in FIG. 4, in which a thermal energy storage device 20 includes a first container 22 for containing a quantity of LiH phase change material, such as $Li^6H$, and a second container 24 for containing a quantity of $H_2$ sorbing material. The $H_2$ sorbing material can be any of those referred to above with respect to the previous embodiment. Both containers are preferably 304L stainless steel or molybdenum. A conduit 26, such as ⅛ inch diameter stainless steel piping, places the interiors of the two containers 22 and 24 in fluid communication with each other, so that when container 22 is exposed to sufficient heat, $H_2$ created by dissociation travels through the conduit 26 to the second container and is stored in the $H_2$ sorbing material. As in the previous embodiment, when the container 22 is cooled during regeneration, the $H_2$ flows back through the conduit 26 to the container 22.

An isolation valve 28 may be provided in the conduit 26 to prevent $H_2$ flow between the two containers. When heating occurs, the valve is preferably opened by an actuator 30 to allow $H_2$ to flow into the second container 24 by differential pressure. During regeneration, the valve remains open to allow $H_2$ to flow back into the first container 22. After regeneration, and before heating, the valve can be closed to prevent $H_2$ not reformed with Li from flowing back. Opening and closing of the valve 28 can be accomplished by sensing either temperature or pressure, or both, in either or both of the containers 22 and 24. For that purpose, temperature sensors 32 and 34 and $H_2$ pressure sensors 36 and 38, feed signals indicative of temperature and pressure to a controller 40. The controller 40 is programmed to output a control signal to the actuator 30 based on a comparison of sensed temperature and/or $H_2$ pressure to stored values. For example, a "high" temperature sensed by sensor 32 may require opening of the valve 28, since dissociation occurs at high temperatures. Operation of the valve 28 may also be based on time, if the pulsed power usages are at regularly scheduled intervals, for example.

Figure 5:
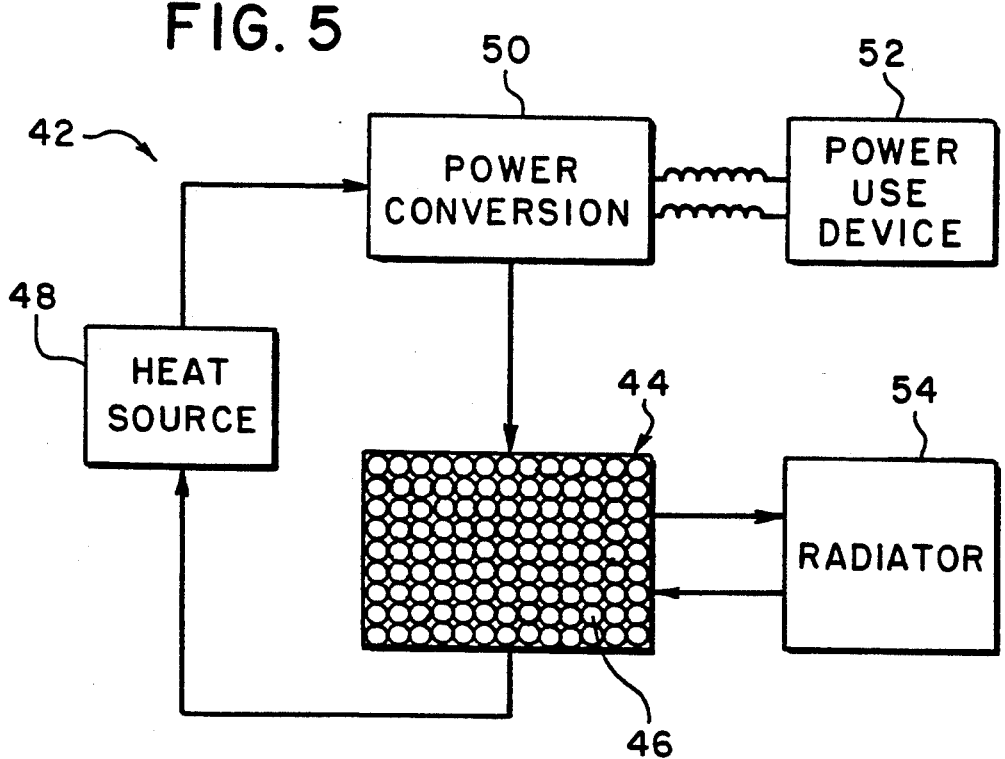
FIG. 5 is a schematic view of a power system employing plural thermal energy storage devices of the embodiment of FIGS. 1 and 2.

An example of the spherical (concentric) thermal energy storage devices used in a space-based application is illustrated in FIG. 5, which illustrates schematically a no effluent space power system 42 employing an encapsulated sink-side thermal storage unit 44. The unit 44 is a container that holds a plurality of spherical thermal energy storage devices 46 such as those described above with reference to the embodiment of FIGS. 1 and 2. A heat source 48 could be any of nuclear, chemical or solar varieties that require produce heat. A power conversion unit 50 can be any dynamic system such as those using Rankine and Brayton cycles, or static systems such as those using thermionics. A power use device 52 would be of the type that operates at high power levels in pulsed mode, wherein heat generation is high but for relative short periods.

Waste heat would be stored in the encapsulated LiH during power burst operations as a heat transport fluid circulates through the storage unit 44 during burst power operation. The stored heat would then be rejected over the longer, non-operational portion of the orbit through a radiator 54. Typical heat transport fluids include NaK, and lithium, while the radiator could utilize conventional heat pipe technology.

The thermal energy storage system is particularly suited for space power applications where excess thermal energy is produced during pulsed operations. The pulsed power systems generally supply about 300 MWe for generation times of 100 to 1300 seconds. The power supply is generally characterized by the need to deliver high power of up to 100 MWe for 100–2000 seconds. The thermal energy storage system is able to store the excess thermal energy and dissipate the heat over the non-operational portion of the orbit which may range from 5100 to 5800 seconds.

The preferred thermal energy storage material for many space applications is lithium hydride due to its high heat of fusion (2.9 MJ/kg) and sensible heat (6.3 J/g-K). Lithium hydride further has a melting point of 962° K. making it suitable for many high temperature applications. The thermal energy storage material is operational between 500° K. and 1100° K. with minimum optimum storage temperatures of 500° K. to 700° K. Other similar thermal energy storage materials can be used.

The storage medium in a first embodiment uses the hydrides of naturally occurring lithium which typically consist of 92.5% $Li^7$ and 7.5% $Li^6$. It has been found that the $Li^6$ isotope possesses the same molar properties as the $Li^7$ isotope. Thus, in an alternative preferred embodiment the storage medium is lithium hydride substantially of the $Li^6$ isotope. By using the $Li^6$ isotope, the specific heat for the $Li^6H$ will be 12% higher than for the $Li^7H$ on a total mass basis.

The heat storage apparatus is able to take advantage of the latent heat and the sensible heat of the lithium hydride by contacting the heat storage material with the heat exchange fluid. The lithium hydride inherently dissociates into lithium and free hydrogen at high temperatures. By removing the free hydrogen from the lithium hydride and the lithium metal contained in the heat storage container, the system further utilizes the heat of dissociation of the lithium hydride. The hydrogen sorbent material is reversible to allow the rejuvenation of lithium hydride without loss of capacity of the system. Removing the free hydrogen from the heat storage container prevents substantial increases in pressure and reduces hydrogen loss by diffusion through the container.

The thermal energy storage system is generally operable between about 500° K. and 1100° K. Typically, the thermal storage temperatures are above the melting point of lithium hydride. The elevated temperatures which decompose the lithium hydride to hydrogen and lithium are above the melting point of the lithium such that the lithium remains molten during storage phase.

While the invention has been described in connection with thermal storage in pulsed power space applications, it will be recognized by those skilled in the art that other systems can benefit and utilize the advantages of the invention. The thermal energy storage system can be employed at different temperatures from those disclosed herein and can be used in numerous terrestrial applications. For example, the thermal energy storage system can be used in laser shields, dynamic power systems, pulsed heat rejection systems in thermionic and Rankine power systems, and as a component in providing cooling for the leading edge of aerodynamic structures, such as airplane wings. These and other uses of thermal energy storage system will be recognized by those skilled in the art without departing from the spirit and scope of the invention.

What is claimed is:

1. A thermal energy storage device comprising:

first container means for containing a quantity of $H_2$ sorbing material; and second container means, enveloping the first container means, for containing a quantity of LiH phase change material, said phase change material being in a solid phase until heated by a heat source to a liquid phase, whereby $H_2$ and Li are produced by dissociation, said $H_2$ passing through the first container means and being stored in the $H_2$ sorbing material until the LiH phase change material is regenerated by cooling, whereby the $H_2$ passes back through the inner shell and reforms with the Li.

2. A thermal energy storage device according to claim 1, wherein the first container means is an inner shell made of $H_2$ permeable material, and the second container means is an outer shell.

3. A thermal energy storage device according to claim 2, wherein the inner and outer shells are spherically shaped and substantially concentric.

4. A thermal energy storage device according to claim 2, wherein the inner shell is made of Fe.

5. A thermal energy storage device according to claim 2, wherein the $H_2$ first sorbing material is a Na-based zeolite.

6. A thermal energy storage device according to claim 2, wherein the $H_2$ sorbing material is a K-based zeolite.

7. A thermal energy storage device according to claim 2, wherein the $H_2$ sorbing material is activated charcoal.

8. A thermal energy storage device according to claim 2, wherein the outer shell is made of stainless steel.

9. A thermal energy storage device according to claim 2, wherein the outer shell is made of molybdenum.

10. A thermal energy storage device according to claim 2, wherein the inner and outer shells are spherically shaped and substantially concentric, the $H_2$ sorbing material is selected from the group consisting of a Na-based zeolite, a K-based zeolite, and activated charcoal, and the outer shell is made of a material selected from the group consisting of stainless steel and molybdenum.

11. A thermal energy storage device comprising:

first container means for containing a quantity of $H_2$ sorbing material;

second container means for containing a quantity of LiH phase change material;

conduit means for placing the first container means in fluid communication with the second container means; and valve means, disposed in the conduit means, for controlling flow through the conduit means, said phase change material being in a solid phase until heated by a heat source to a liquid phase, whereby $H_2$ and Li are produced by dissociation, said $H_2$ passing from the first container means to the second container means through the conduit means and being stored in the $H_2$ sorbing material until the LiH phase change material is regenerated by cooling, whereby the $H_2$ passes back to the first container means through the conduit means and reforms with the Li.

12. A thermal energy storage device according to claim 11, wherein the valve means comprises a valve actuated in response to temperature of the first container means.

13. A thermal energy storage device according to claim 11, wherein the valve means comprise a valve actuated in response to temperature of the second container means.

14. A thermal energy storage device according to claim 11, wherein the valve means comprises a valve actuated in response to $H_2$ pressure in the first container means.

15. A thermal energy storage device according to claim 11, wherein the valve means comprises a valve actuated in response to $H_2$ pressure in the second container means.

16. A thermal energy storage device according to claim 11, wherein the first container means is an inner shell made of $H_2$ permeable material, and the second container means is an outer shell.

17. A thermal energy storage device according to claim 16, wherein the inner and outer shells are spherically shaped and substantially concentric.

18. A thermal energy storage device according to claim 16, wherein the inner shell is made of Fe.

19. A thermal energy storage device according to claim 16, wherein the $H_2$ sorbing material is a Na-based zeolite.

20. A thermal energy storage device according to claim 16, wherein the $H_2$ sorbing material is a K-based zeolite.

21. A thermal energy storage device according to claim 16, wherein the $H_2$ sorbing material is activated charcoal.

22. A thermal energy storage device according to claim 16, wherein the outer shell is made of stainless steel.

23. A thermal energy storage device according to claim 16, wherein the outer shell is made of molybdenum.

24. A thermal energy storage device according to claim 16, wherein the inner and outer shells are spherically shaped and substantially concentric, the $H_2$ sorbing material is selected from the group consisting of a Na-based zeolite, a K-based zeolite, and activated charcoal, and the outer shell is made of a material selected from the group consisting of stainless steel and molybdenum.

* * * * *